(12) United States Patent
Malusev et al.

(10) Patent No.: US 6,213,546 B1
(45) Date of Patent: Apr. 10, 2001

(54) SLIDING ACTUATION ARMREST

(75) Inventors: Aleksandar D. Malusev; Susan H. Smith, both of Northville, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/448,158

(22) Filed: Nov. 24, 1999

(51) Int. Cl.⁷ .................................................. A47C 13/00
(52) U.S. Cl. ............................................................ 297/113
(58) Field of Search ................................ 297/411.2, 411.3, 297/112, 113, 115, 238

(56) References Cited

U.S. PATENT DOCUMENTS

| | | |
|---|---|---|
| 1,894,621 * | 1/1933 | Lehman . |
| 3,893,585 | 7/1973 | Morrison et al. . |
| 4,052,103 | 10/1977 | Steinthal . |
| 4,230,366 | 10/1980 | Ruda . |
| 4,558,901 | 12/1985 | Yokoyama . |
| 4,601,515 | 7/1986 | Hatsutta et al. . |
| 4,621,864 * | 11/1986 | Hill . |
| 4,674,790 | 6/1987 | Johnson . |
| 4,756,569 | 7/1988 | Trutter et al. . |
| 4,858,995 | 8/1989 | Young . |
| 4,889,386 | 12/1989 | Kochy et al. . |
| 5,316,373 | 5/1994 | Markel . |
| 5,342,115 | 8/1994 | De Filippo . |
| 5,395,161 | 3/1995 | Spykerman et al. . |
| 5,433,503 * | 7/1995 | De Filippo . |
| 5,464,272 | 11/1995 | Spykerman et al. . |
| 5,489,143 | 2/1996 | Adachi et al. . |
| 5,524,958 | 6/1996 | Wieczorek et al. . |
| 5,540,479 * | 7/1996 | Thomas et al. . |
| 5,628,543 * | 5/1997 | Filipovich et al. . |
| 5,660,433 | 8/1997 | Bruhnke et al. . |
| 5,752,739 | 5/1998 | Saeki . |

* cited by examiner

Primary Examiner—Milton Nelson, Jr.
(74) Attorney, Agent, or Firm—Foley & Lardner

(57) ABSTRACT

An armrest assembly for a seat having stowed and deployed positions, said armrest assembly including a member having a track, and an armrest having a proximal end and a distal end, the armrest coupled to the track at the distal end and slidable along the track from the stowed position to the deployed position.

20 Claims, 7 Drawing Sheets

SLIDING ACTUATION ARMREST

BACKGROUND OF THE INVENTION

The present invention relates to an armrest for a vehicle. More specifically, the present invention relates to an armrest that is integral to a seatback and slidable from a stowed position to a use position and visa-versa.

Vehicle armrests have been fabricated in a variety of forms to accommodate various seat structures and configurations present in modem automobiles, such as rear bench seats. Present conventional armrests mounted in the rear seat of an automobile deploy from the stowed position to the use position by rotating about a fixed pivot in the seat structure. The stowed position is typically a generally vertical position with the armrest fitted into the seat back to form a flush seatback surface and the use position is typically a generally horizontal position at approximately the elbow height for a user. In operation, a conventional rotatable armrest will be rotated by the user from the stowed position to the use position.

One disadvantage with conventional rotatable armrests is that they are generally difficult to install and mechanically intricate, as they require numerous fittings to be attached to the seat back frame. In this regard, rotatable armrests require that a pivot point be installed in the frame of the seat and that both the top and bottom surfaces be trimmed with cover material. These additional fittings and trim material cause the installation of a rotatable armrest to be highly complex.

Furthermore, present rotatable armrests are not ergonomically friendly, as they require the user to first move his or her arm and then to rotate the armrest from its generally vertical stowed position to its generally horizontal use position. This action is time consuming and may also be difficult or awkward for less dexterous individuals to execute.

Accordingly, it is an object of the present invention to provide an ergonomically deployed armrest assembly that is easily installed into a standard vehicle seat which does not suffer from the above mentioned disadvantages.

SUMMARY OF THE INVENTION

In accordance with the present invention, an armrest assembly is provided with modular packaging and a slidable deployment mechanism. The armrest assembly includes a support frame that mounts in simple fashion to a seat frame using tabs and conventional fasteners. An armrest is slidably coupled at one end to slots in the support frame and is pivotably coupled on its bottom surface to a load-bearing lever that is also pivotably coupled to the support frame.

The armrest deploys from a generally vertical stowed position in the armrest assembly to a generally horizontal use position in a sliding/pivoting ergonomic fashion. In operation, a seated user will generate downward and/or forward forces on the armrest to deploy the armrest, using an elbow or other portion of the arm, or alternatively by pulling the armrest with a hand. One end of the armrest slidably couples to the slots in the support frame, allowing the armrest to slide and pivot downward along the fixed path provided by the slots. The lever, as it pivots and deploys to a load-bearing position, will force the armrest to gradually pivot from a vertical position to a horizontal use position. The lever is pivotably coupled at the bottom end of the support frame and is parallel to and hidden under the armrest in the stowed position. The lever will pivot about its pivot coupling on the support frame and extend outward, thus generating a force on its pivot coupling point on the bottom surface of the armrest. Accordingly, the downward and/or forward forces exerted by the user will place the lever in a load-bearing position for the armrest in the use position.

The deployment method of the armrest assembly of the present invention is simple and ergonomic, as the user's arm is on the top or use surface of the armrest at all times during its deployment. The user does not have to lift an arm to pivot the armrest, as in conventional assemblies, rather the user need only push or pull downward and/or forward on the armrest.

Furthermore, the modular packaging of the present invention allows the armrest assembly to be easily inserted into the cutout of a seat cushion. Tabs on the top of the support frame of the armrest assembly slip into coupling apertures on a seat frame and the bottom of the support frame is coupled to a seat frame with conventional fasteners. This simple tab and fastener coupling method is superior to the multi-part installation of conventional rotating armrests. The amount of trim material for the armrest of the present invention is also reduced, as compared to a conventional rotatable armrest, since only one surface is exposed to a user in both the stowed and deployed positions. The reduction of trim material simplifies the armrest of the present invention and reduces its overall thickness.

BRIEF DESCRIPTION OF THE DRAWINGS

The various advantages of the present invention will become apparent to those skilled in the art after reading the following specification and by reference to the drawings, in which.

DETAILED DESCRIPTION OF THE PREFERRED EMBODIMENT

The following description of the present invention is merely exemplary in nature and is in no way intended to limit the invention or its uses. Moreover, the following description, while depicting an armrest assembly designed to operate with vehicles seats, is intended to adequately teach one skilled in the art to make and use the armrest assembly of the present invention with any type of seat system to which it may be adapted.

Figure 1A:
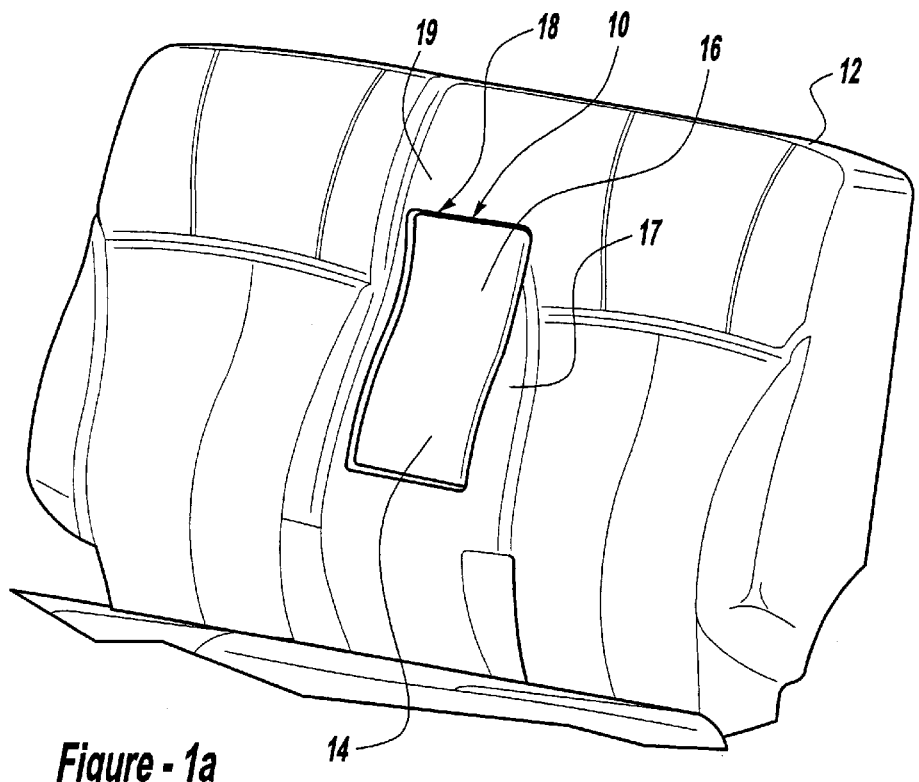
FIGS. 1a and 1b are perspective views of a seat incorporating the armrest assembly according to the preferred embodiment of the present invention.
Figure 1B:
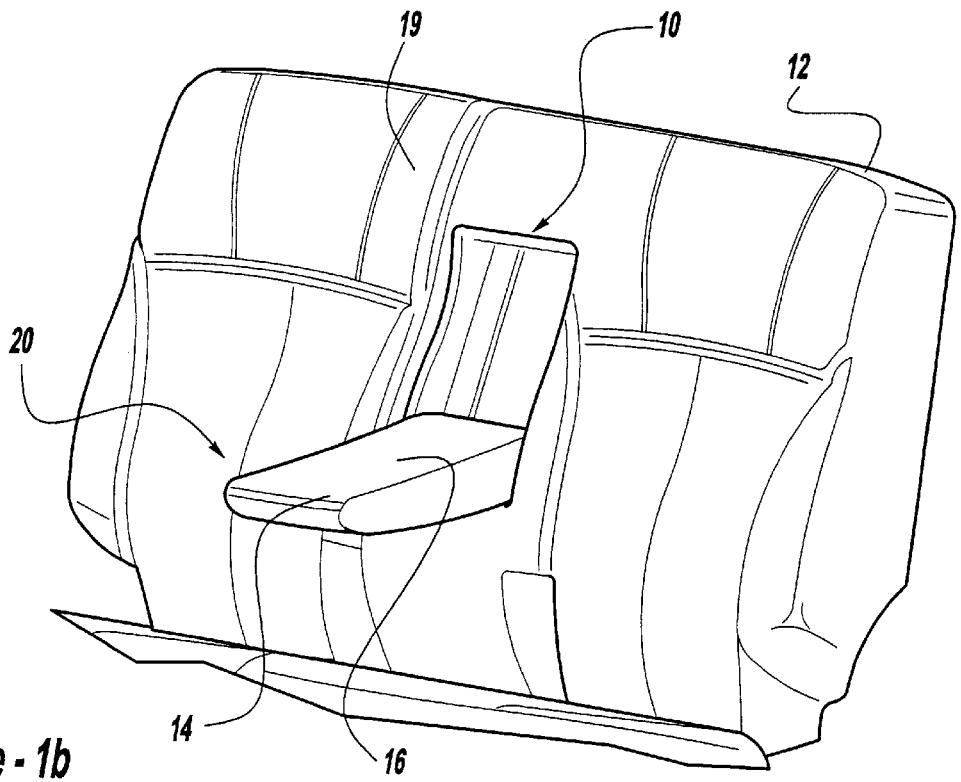

Referring to FIGS. 1a and 1b, the armrest assembly 10 is shown installed in a seat assembly 12. An armrest 14, having a proximal end and a distal end, in FIG. 1a is shown in its stored or stowed, generally vertical position 18 with a top side or use surface 16 of the armrest 14 flush with the seating surface 17 of the seat assembly 12 or seatback 19. In FIG. 1b, the armrest 14 is shown in its horizontal use or deployed position 20 with the proximal end of the armrest extending from the seat assembly 12 and the distal end coupled to the seat assembly 12. The seat assembly 12 may be any common seat assembly 12 configured for a vehicle, but in the preferred embodiments is a rear seat for a vehicle.

Figure 2:
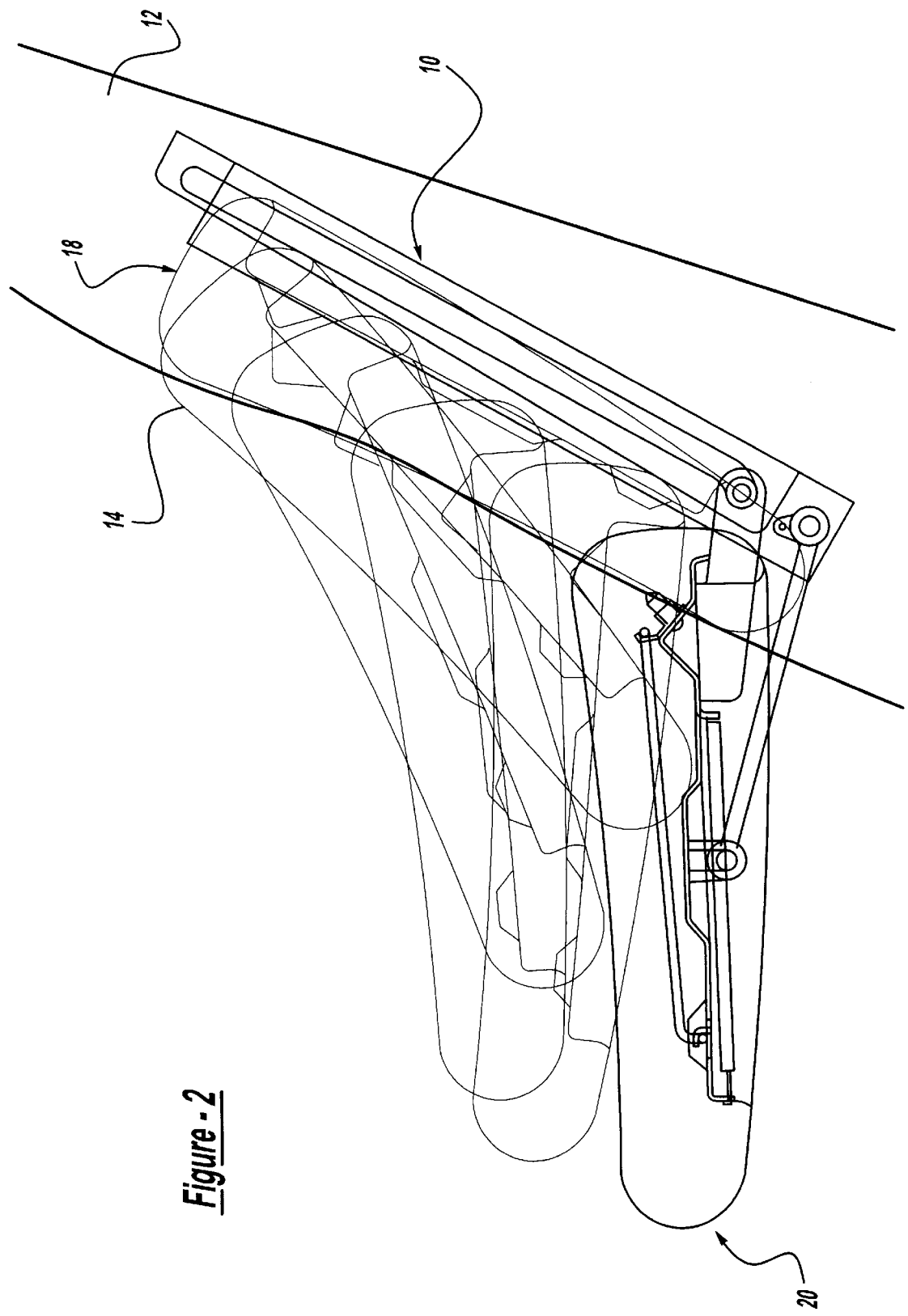
FIG. 2 is a side diagrammatic view of the armrest assembly shown in FIG. 1 according to the preferred embodiment of the present invention, illustrating the deployment of the armrest assembly.

FIG. 2 illustrates the dynamics and multiple positions of the armrest 14 during deployment from the armrest assembly 10 of the present invention. As can be seen from the multiple positions of the armrest 14, the armrest 14 slides and pivots from the stowed position 18 to the deployed or use position 20. The armrest 14 gradually transitions from the stowed position 18 to the use position 20, eliminating any radical movements of a user's arm. The user merely exerts downward or forward pressure using an arm or hand on the armrest 14 to deploy the armrest 14 into the use position 20.

Referring to FIGS. 3–7, the armrest assembly 10 comprises various components that cooperate to allow the armrest assembly 10 of the present invention to be installed in a seat assembly 12 and allow the armrest 14 to be deployed from the armrest assembly 10. The armrest assembly 10 comprises a support and installation frame 22 having a reinforcement structure 24 and a panel 26. The reinforcement structure 24 and the panel 26 are preferably integrally molded to form the installation frame 22. The reinforcement structure 24 is preferably steel and the panel 26 is preferably polymeric, but any similar materials with sufficient strength and rigidity are considered within the scope of the present invention. The reinforcement structure 24 includes tracks or slots 36 which will be discussed in conjunction with the operation of the armrest assembly 10. The installation frame 22 is the primary mounting apparatus of the armrest assembly 10 and is mounted to a seat frame (not shown) using tabs 28 that are inserted into apertures (not shown) in the seat frame and mechanical fasteners 30 which couple to the reinforcement structure 24 and panel, 26 via apertures 32 and 34 and fastening holes (not shown) in the seat frame. The mechanical fasteners 30 in the preferred embodiment are threaded bolts or screws. The use of simple tabs and mechanical fasteners in the mounting of the armrest assembly 10 to a seat frame makes the armrest assembly 10 simple to mount and reduces the number of components, as compared to convention rotatable armrests.

Figure 3:
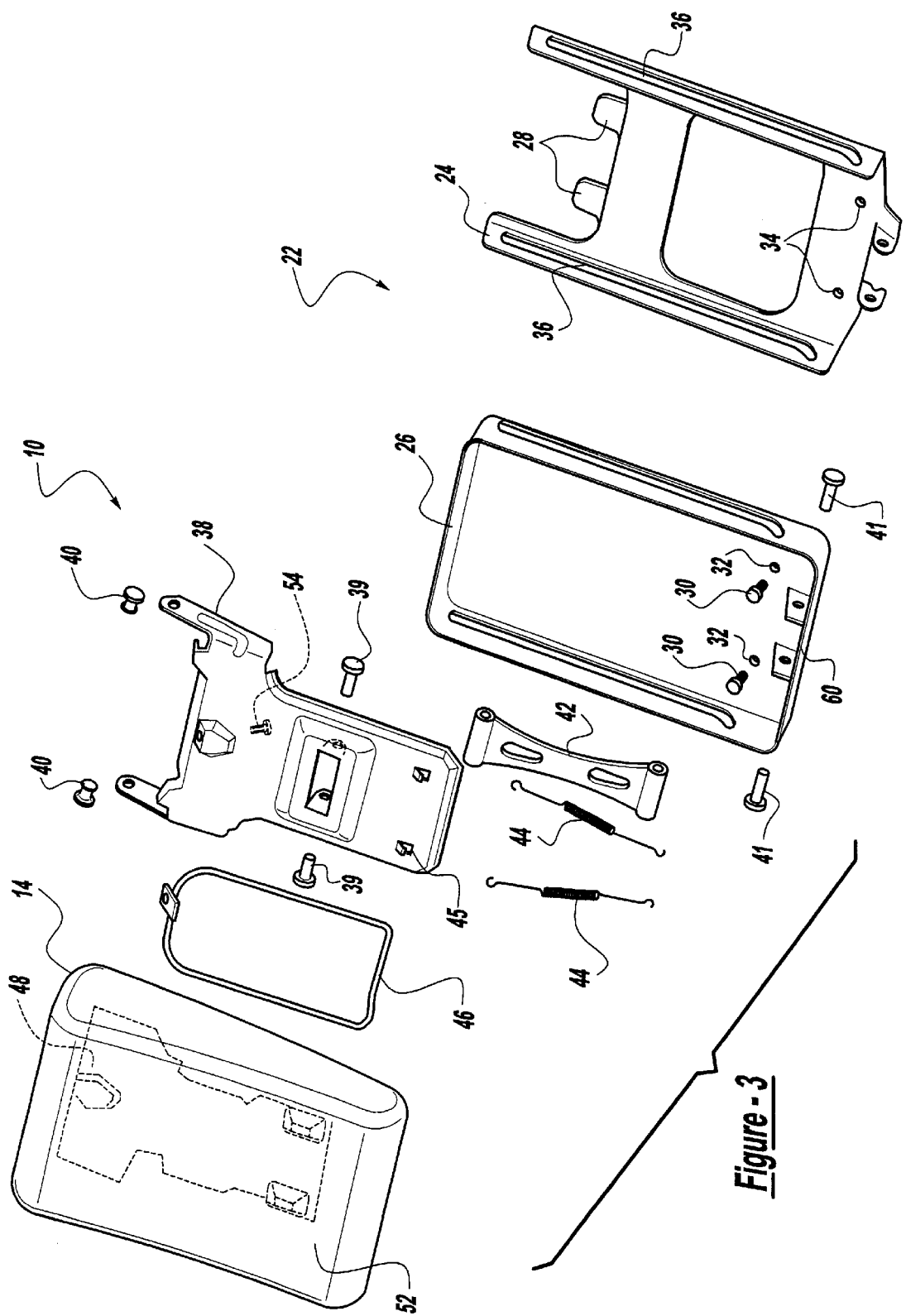
FIG. 3 is an exploded perspective view of the armrest assembly according to the preferred embodiment of the present invention.
Figure 4:
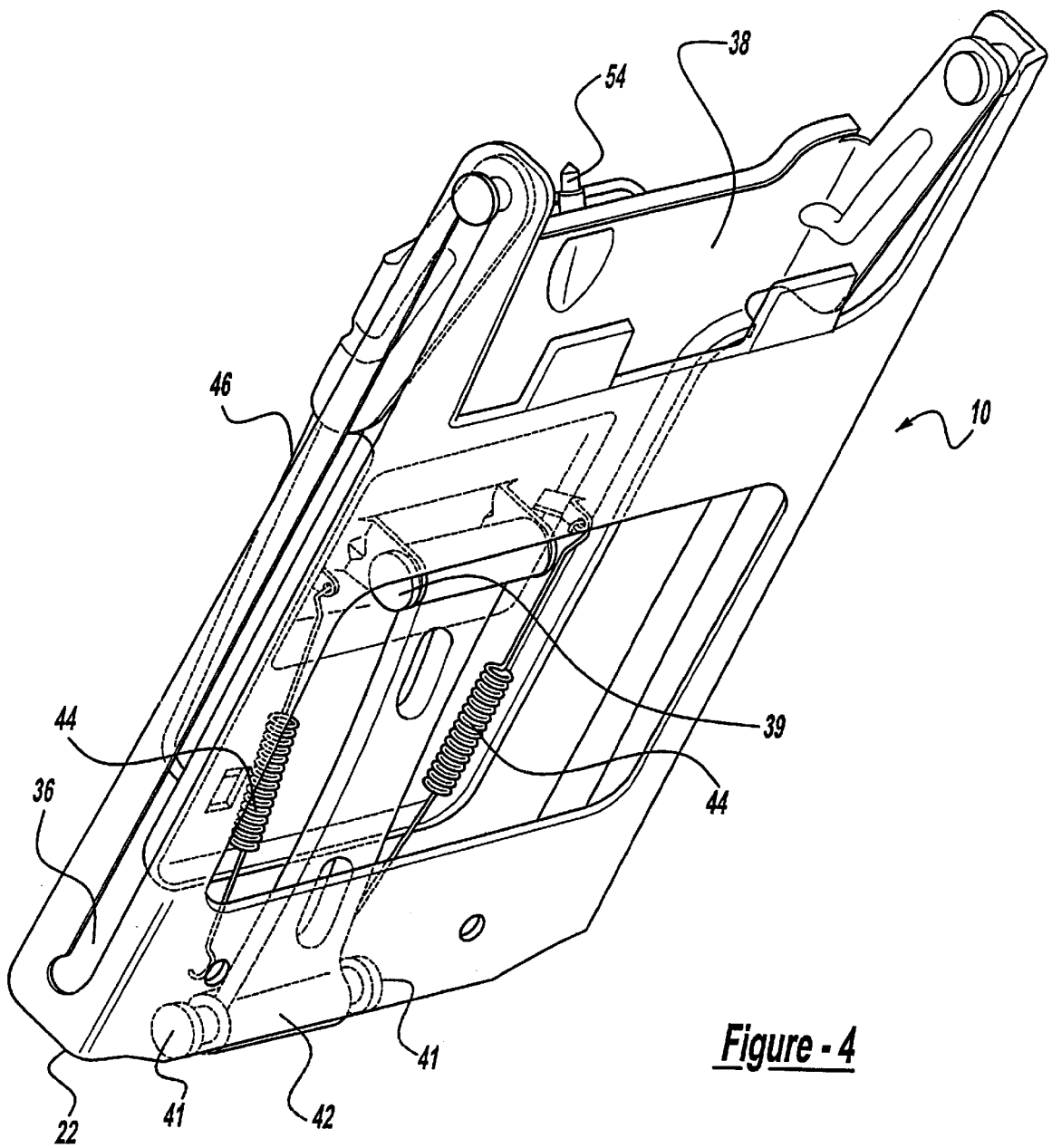
FIG. 4 is a rear perspective view of a portion of the armrest assembly according to the preferred embodiment of the present invention shown in a stowed position.
Figure 5:
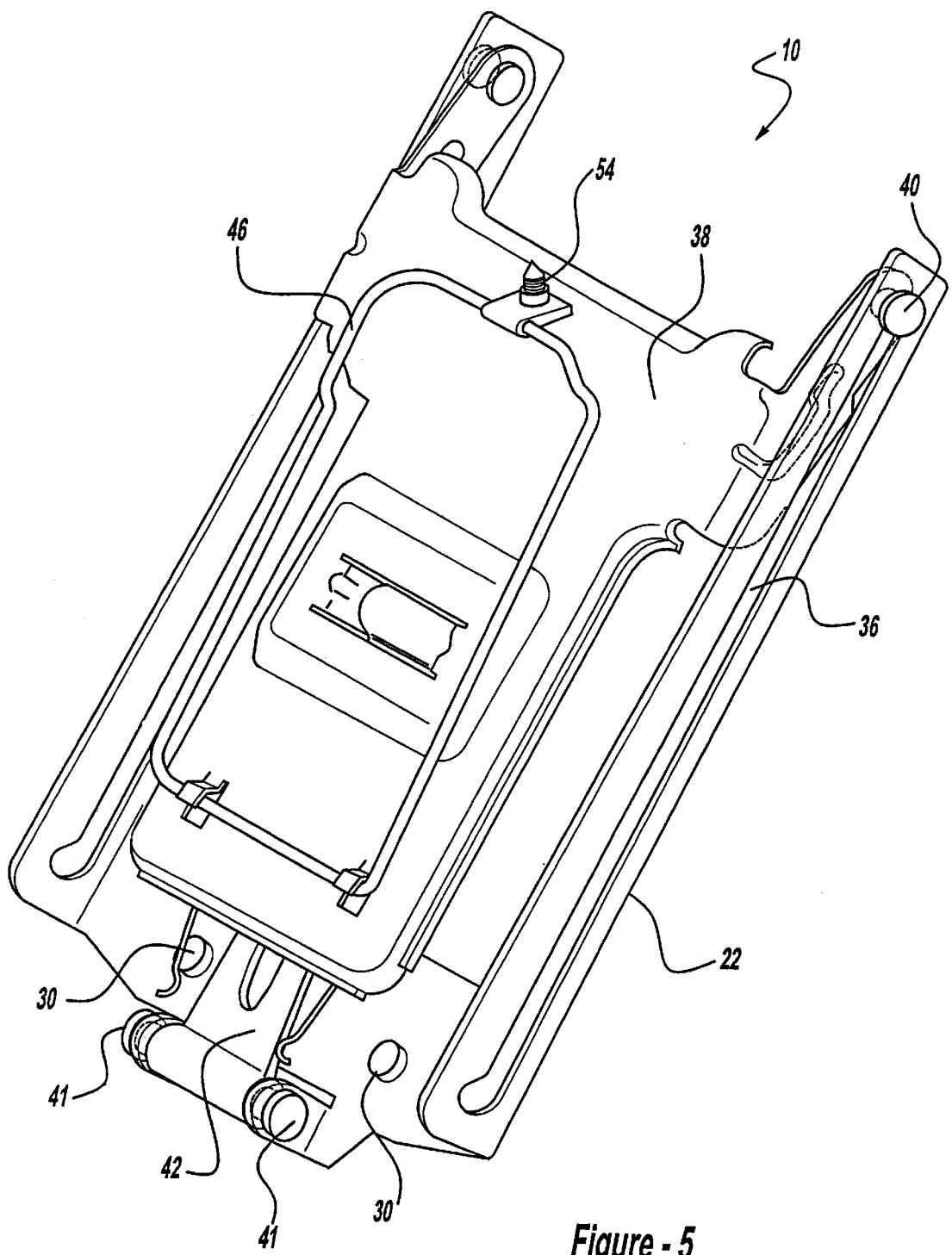
FIG. 5 is a front perspective view of a portion of the armrest assembly according to the preferred embodiment of the present invention shown in a stowed position.
Figure 7:
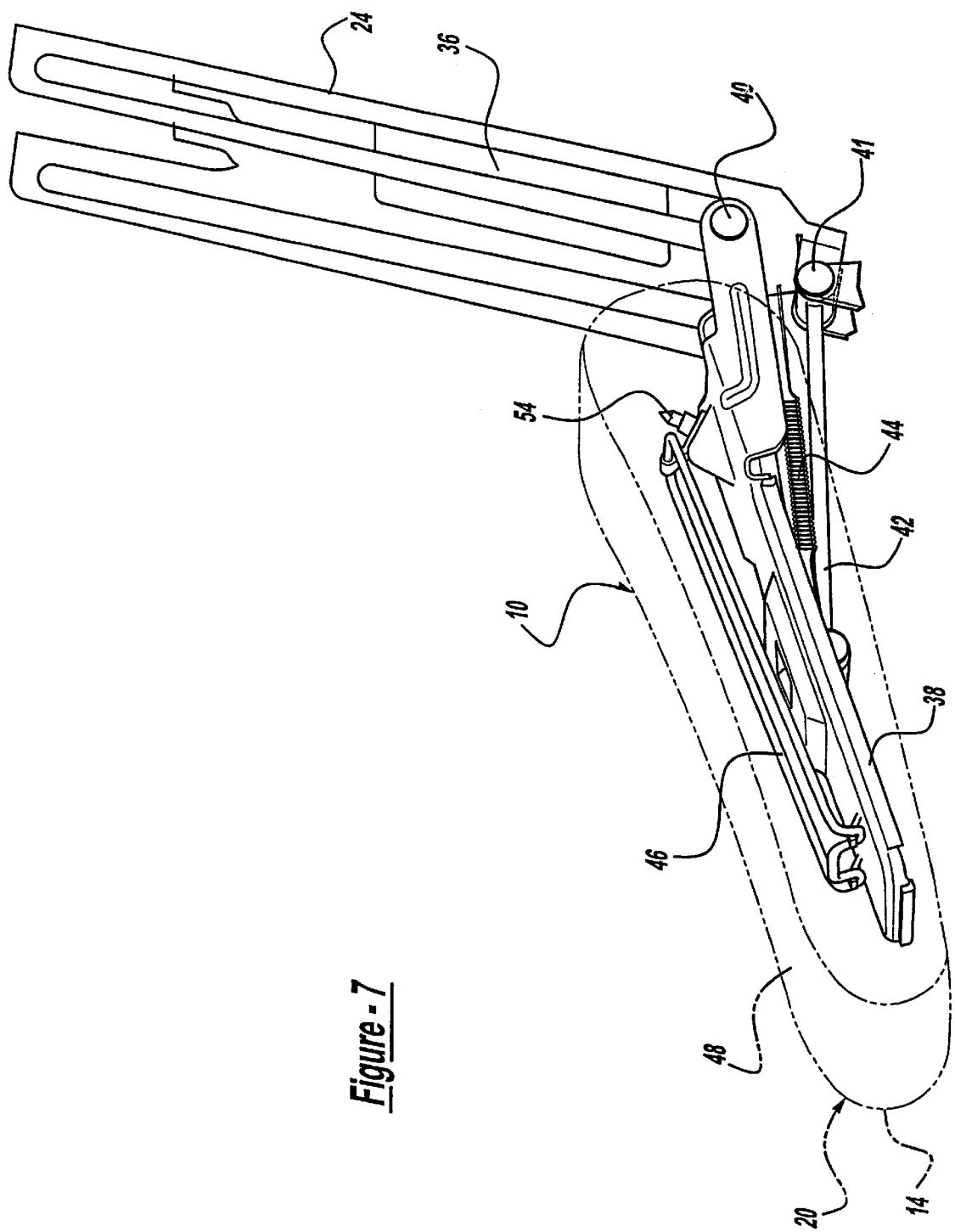
FIG. 7 is a top perspective view of the armrest assembly according to the preferred embodiment of the present invention shown in a deployed position.

Referring to FIGS. 3–5, the armrest 14 includes a support frame 38 having shoulder rivets or pegs 40 located on a first end of the support frame 38. A link or lever 42 is further pivotably coupled to the underside of the support frame 38 with pins 39 and pivotably coupled to the panel 26 with pins 41. Accordingly, the lever 42 is pivotable at both its ends. Springs 44 are further coupled to slots or tabs 45 on the underside of the support frame 38 and the panel 26, as shown clearly in FIG. 4. The support frame 38 is coupled to a wire insert 46 located in a trim foam assembly 48. The support frame 38, the lever 42, and the wire insert 46 are comprised of any metal, polymeric material, or composite that may be used for load-bearing applications. The wire insert 46, the trim foam assembly 48, and the support frame 38 in conjunction form the armrest 14. The trim and foam assembly 48 is preferably injection molded and formed around the wire insert 46. The trim cover 52, as seen in FIGS. 3 and 7, preferably covers only the use surfaces (particularly the top surface 16) exposed to a user during the operation of the armrest 14. This eliminates the need to trim the bottom of the armrest 14, reducing manufacturing time and the amount of trim needed to form the armrest 14. The wire insert 46 is coupled to the support frame 38 by a mechanical fastener 54 such as a threaded bolt or nut to provide structural rigidity for the armrest 14.

Figure 6:
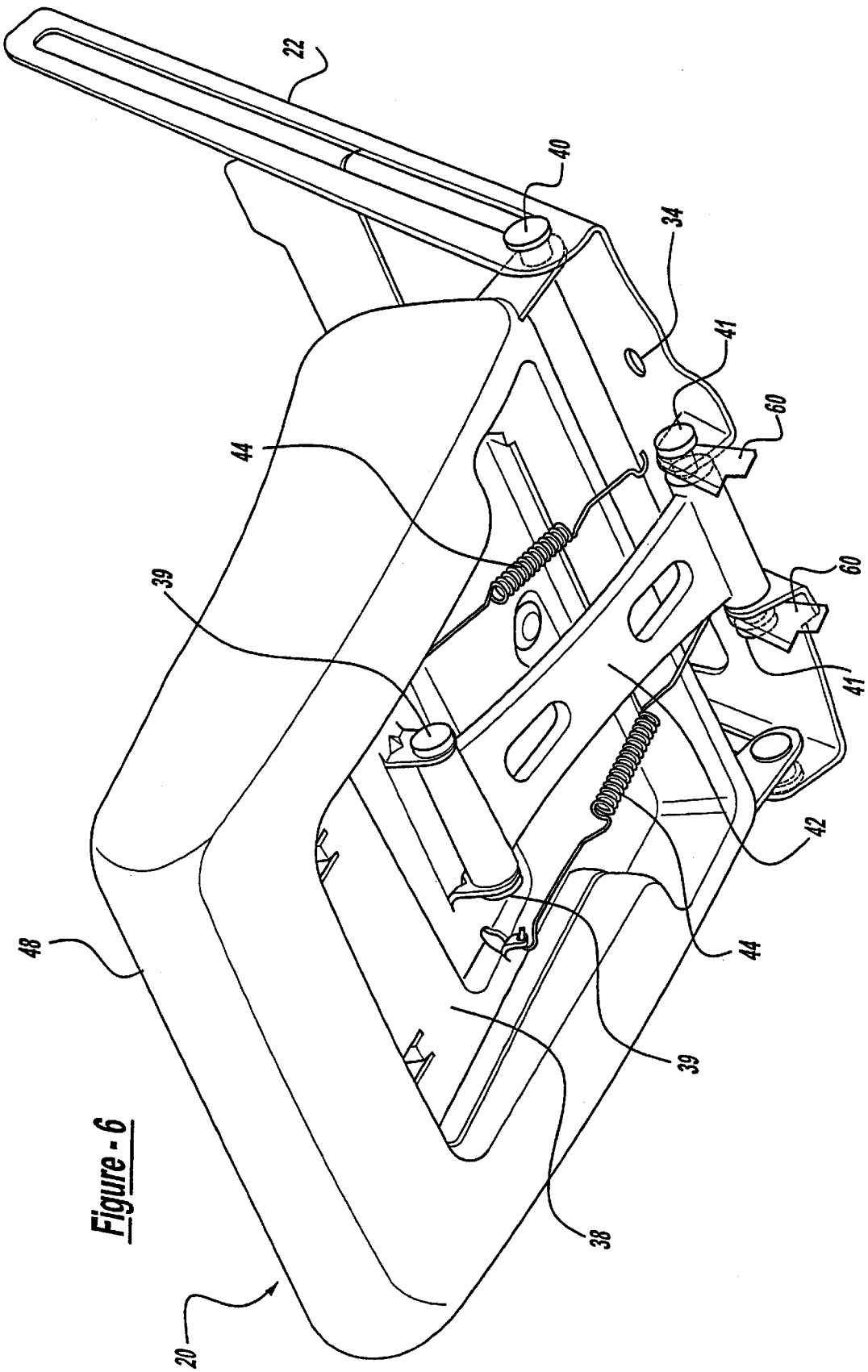
FIG. 6 is a bottom perspective view of the armrest assembly according to the preferred embodiment of the present invention shown in a deployed position.

Referring to FIGS. 2, 6 and 7, in operation, the armrest 14 will slide and pivot from the stowed generally vertical position 18 to the generally horizontal use position 20. The pegs 40 located on the support frame 38 are slidably coupled to move along the length/height of the slots 36 located in the reinforcement structure 24. This sliding motion will cause the lever 42, which is pivotably coupled to both the underside of the armrest 14 and the panel 26, to pivot from a position generally parallel and beneath the armrest 14 to a load-bearing position, as seen in FIGS. 6 and 7. The lever 42 will contact a flange 60 on the panel 26 where the flange 60 will support the lever 42 in its load-bearing position.

The springs 44, as seen in FIGS. 4, 6, and 7, will hold and bias the armrest 14 in both the stowed position 18 and the deployed position 20. It is possible to use the springs 44 in this manner since the springs 44 flip across the pivot arc center point when the armrest 14 is moved from the stowed 18 position to the deployed 20 position or visa-versa.

It is to be understood that the invention is not limited to the exact construction illustrated and described above, but that various changes and modifications may be made without departing from the spirit and scope of the inventions as defined in the following claims.

What is claimed is:

1. Armrest assembly for a seat having stored and deployed positions, said armrest assembly comprising:

a member having a track; and an armrest having a use surface, a proximal end and distal end, said armrest coupled to said track at said distal end and slidable along said deployed position, wherein said use surface forms a seat back surface in said stored position and wherein said use surface forms an armrest surface in said deployed position.

2. The armrest assembly of claim 1 further comprising a lever pivotably coupled to a bottom of said armrest and pivotably coupled to said member.

3. The armrest assembly of claim 1 further comprising at least one spring for biasing said armrest in one of the stored position and the deployed position.

4. The armrest assembly of claim 1, wherein said member comprises a panel member and a reinforcement member.

5. The armrest assembly of claim 1, wherein said armrest includes pegs slidably coupled to said track in said member.

6. The armrest assembly of claim 1, wherein said member is adapted to couple to a vehicle seat frame with at least one bolt.

7. The armrest assembly of claim 1, wherein said armrest comprises a fabric cover enclosing a foam section, said foam section provided with structural rigidity by a wire form located in said foam section.

8. The armrest assembly of claim 7, wherein said armrest further comprises a support frame coupled to said wire form.

9. The armrest assembly of claim 1, wherein said armrest includes an exposed bottom surface.

10. The armrest assembly of claim 9, wherein said armrest comprises a cover enclosing a foam section, said foam section provided with structural rigidity by a wire form located in said foam section.

11. The armrest assembly of claim 10, said armrest further comprising a frame coupled to said wire form.

12. An armrest assembly, having a stowed position and a deployed position for use in a vehicle, said armrest assembly comprising:

an armrest having at least one slidable engagement member;

a support frame defining at least one slot, said slidable engagement member of said armrest slidably coupled to said slot, said slot defining the movement of said armrest from the stowed position to the deployed position;

a lever having a first end and a second end, said lever pivotably coupled at said first end to an underside of said armrest and said lever pivotably coupled to said support frame at said second end, wherein said lever provides support for said armrest in the deployed position and pivots underneath said armrest in the stowed position.

13. The armrest assembly of claim 12, wherein said support frame is adapted to couple to a vehicle seat frame with at least one fastener.

14. The armrest assembly of claim 12 further comprising at least one spring coupled to said armrest and to said support frame, said spring biasing said armrest in the stowed position or the deployed position.

15. The armrest assembly of claim 12, wherein said support frame comprises a panel member integrally molded to a reinforcement member.

16. A modularly packaged armrest assembly for a vehicle seat, said modularly packaged armrest assembly comprising;

a support structure comprising a panel molded to a reinforcement member;

a lever pivotably coupled to an end of said support structure; and an armrest slidably coupled to said support structure comprising a support frame coupled to a wire form located in a foam cushion, said foam cushion having a cover, wherein said support frame is pivotably coupled to said lever.

17. The armrest assembly of claim 16, wherein said armrest includes pegs slidably coupled to slots in said support structure, said slots forming a fixed path of travel for said armrest.

18. The armrest assembly of claim 17, wherein said armrest is movable from a generally vertical stowed position to a generally horizontal deployed position.

19. The armrest assembly of claim 18, wherein said armrest will pivot from said generally vertical stowed position to said generally horizontal deployed position as said armrest slides along said support structure.

20. The armrest assembly of claim 19, wherein said lever will pivot from a position generally parallel with said armrest to a load-bearing position underneath said armrest, as said armrest slides along said support structure and pivots from said generally vertical stowed position to said generally horizontal deployed position.

* * * * *